US008037083B2

(12) United States Patent
Meyer et al.

(10) Patent No.: US 8,037,083 B2
(45) Date of Patent: Oct. 11, 2011

(54) LOSSLESS FORMAT-DEPENDENT ANALYSIS AND MODIFICATION OF MULTI-DOCUMENT E-LEARNING RESOURCES

(75) Inventors: Marek Meyer, Schwalbach (DE); Tomas Hildebrandt, Darmstadt (DE)

(73) Assignee: SAP AG, Walldorf (DE)

(*) Notice: Subject to any disclaimer, the term of this patent is extended or adjusted under 35 U.S.C. 154(b) by 329 days.

(21) Appl. No.: 11/287,628

(22) Filed: Nov. 28, 2005

(65) Prior Publication Data

US 2007/0124322 A1 May 31, 2007

(51) Int. Cl.
*G06F 7/00* (2006.01)
(52) U.S. Cl. .......................................... 707/756; 434/118
(58) Field of Classification Search ............... 707/3, 102
See application file for complete search history.

(56) References Cited

U.S. PATENT DOCUMENTS

| | | | |
|---|---|---|---|
| 6,820,075 B2 | 11/2004 | Shanahan et al. | |
| 6,884,074 B2 | 4/2005 | Theilmann | |
| 6,928,425 B2 | 8/2005 | Grefenstette et al. | |
| 2002/0049743 A1* | 4/2002 | Hall | 707/1 |
| 2002/0102524 A1 | 8/2002 | Rizzi et al. | |
| 2002/0188583 A1 | 12/2002 | Rukavina et al. | |
| 2002/0197595 A1 | 12/2002 | Hoyashita et al. | |
| 2003/0126136 A1 | 7/2003 | Omoigui | |
| 2003/0177049 A1 | 9/2003 | Honda et al. | |
| 2004/0002039 A1 | 1/2004 | Draper et al. | |
| 2004/0153508 A1 | 8/2004 | Alcorn et al. | |
| 2004/0153509 A1 | 8/2004 | Alcorn et al. | |
| 2004/0259068 A1 | 12/2004 | Philipp et al. | |
| 2005/0014121 A1 | 1/2005 | Eck et al. | |
| 2005/0019739 A1 | 1/2005 | Cunningham et al. | |
| 2005/0060221 A1 | 3/2005 | Kolar et al. | |
| 2005/0131920 A1* | 6/2005 | Rust et al. | 707/100 |
| 2005/0192955 A1 | 9/2005 | Farrell | |
| 2005/0203931 A1 | 9/2005 | Pingree et al. | |
| 2005/0223315 A1 | 10/2005 | Shimizu et al. | |
| 2005/0277100 A1 | 12/2005 | Bagley et al. | |
| 2006/0155656 A1 | 7/2006 | Kreder, III et al. | |
| 2007/0067335 A1* | 3/2007 | Erhard et al. | 707/102 |
| 2007/0231781 A1 | 10/2007 | Zimmermann et al. | |

OTHER PUBLICATIONS

Bhavsar, Virendrakumar C., et al., "A Weighted-Tree Similarity Algorithm for Multi-Agent Systems in E-Business Environments", http://www.cs.unb.ca/~boley/treesimilarity/BhavsarBoleyYang-CI. doc, Present at the Business Agents and the Semantic Web (BASeWEB) Workshop,(Jun. 2003),20 pages.

Collier, Geoff , "e-Learning Application Infrastructure, White Paper", *Sun Microsystems. Inc.*, (2002),28 pages.

(Continued)

*Primary Examiner* — John E Breene
*Assistant Examiner* — Christopher J Raab
(74) *Attorney, Agent, or Firm* — Brake Hughes Bellermann LLP

(57) ABSTRACT

Content stored in a plurality of electronic files that belong to a course of learning resources is read. An object-oriented representation of structures of the content is generated, where the representation includes objects that represent portions of the content, and a semantic content model of the content is generated based on the object-oriented representation of the content. Instructions to modify the content are received and the object-oriented representation of the structures of the content is modified in response to the instructions from the user. In response to the modified object-oriented representation of structures of the content the content is modified.

14 Claims, 6 Drawing Sheets

OTHER PUBLICATIONS

Dong, Andy, et al., "Automatic Composition of XML Documents to Express Design Information Needs", http://best.me.berkeley.edu/~aagogino/papers/ICED2001_C586_422.pdf, International Conference on Enginerring Design ICED 01 Glasgow,(Aug. 21-23, 2001),8 pages.

Jones, Ray, "Designing Adaptable Learning Resources with Learning Object Patterns", http://jodi.tamu.edu/Articles/v06/i01/Jones/, Journal of Digital Information, vol. 6, Issue 1, Article 305,(Dec. 10, 2004),15 pages.

Nilsson, Mikael, et al., "Semantic Web Meta-data for e-Learning—Some Architectural Guidelines", *Knowledge Management Research Group Centre for User Oriented IT Design*, Department of Numerical Analysis and Computer Science Royal Institute of Technology Stockholm, Sweden,(Mar. 14, 2002),22 pgs.

"European Search Report for Application No. 06023169.3", (Feb. 9, 2007).

Del, C. D., et al., "The 3DE Custom Course Compiler: An Engine to Assemble Custom Web Courses", FIE 2002. 32ND Annual Frontiers in Education Conference, vol. 1 of 3, Conf. 32, (Nov. 6, 2002).

Knight, C., et al., "Ontologies to Integrate Learning Design and Learning Content", Journal of Interactive Media in Education, XP002417728, (Aug. 24, 2005).

Schluep, S., et al., "Implementing Learning Content Management", International Conference on Human-Computer Interaction-Interact'03, XP002417727, (Sep. 1, 2003).

EPO Communication pursuant to Article 96(2) EPC for Application No. 06023169.3 (Jul. 24, 2007).

Kellar, Melanie et al., "An Information Architecture to Support Dynamic Composition of Interactive Lessons and Reuse of Learning Objects", Proceedings of the 37th Hawaii International Conference on System Sciences, pp. 1-10 (2004).

Office Action for EP Patent Application No. 06023169.3, mailed Jul. 24, 2007, 4 pages.

Office Action Response for EP Patent Application No. 06023169.3, filed Sep. 24, 2007, 23 pages.

Office Action for EP Patent Application No. 06023169.3, mailed Aug. 21, 2008, 5 pages.

Office Action Response for EP Patent Application No. 06023169.3, filed Nov. 3, 2008, 6 pages.

Gasevic, D., et al, "Ontologies for Reusing Learning Object Content", Fifth IEEE International Conference on Advanced Learning Technologies (Jul. 5-8, 2005), pp. 1-10.

Intent to Grant for EP Patent Application No. 06023169.3, mailed Mar. 13, 2009, 5 pages.

Non-Final Office Action for U.S. Appl. No. 11/395,365, mailed Jun. 24, 2010, 36 pages.

* cited by examiner

LOSSLESS FORMAT-DEPENDENT ANALYSIS AND MODIFICATION OF MULTI-DOCUMENT E-LEARNING RESOURCES

TECHNICAL FIELD

This description relates to managing electronic content and, in particular, to lossless format-dependent analysis and modification of multi-document e-learning resources.

BACKGROUND

On-line learning tools, courses, and methods have been developed from computer-based delivery (CBT) systems, in which learning resources were depicted as being as atoms or Lego® blocks of content that could be put together or organized to create semantic content. Standards bodies have refined the concept of learning resources into a rigorous form and have provided specifications on how to sequence and organize these bits of content into courses and how to package them for delivery as though they were books, training manuals, or other sources of instructional content.

Electronic instructional content (or "e-learning") for educational, training, infomercial, or entertainment purposes can be delivered to a user through many media (e.g., the Internet, television, playable storage media, such as videotapes, DVDs, CDs, intelligent tutoring systems, and CBT). The instructional content can be delivered to a user in many different forms (e.g., tests, training programs, and interactive media) and is generally referred to herein as a "course." In general, e-learning courses are suites of electronic learning resources (i.e., pieces of data that are used in an e-learning course) and can be composed of modules and lessons, supported with quizzes, tests and discussions, and can be integrated into educational institution's student information system, into a business's employee training system, or any other system in which learning occurs. The learning resources of an e-learning course can be composed of numerous files of many different formats (e.g., text files, PDF files, multimedia files, including jpeg, mpeg, wave, and MP3 files, HTML, and XML files). The number and complexity of the different learning resources in a course can be high and the relations and interfaces between the different learning resources also can be complex.

After a course is developed, it is often desired to modify the course and to reuse existing learning resources for a new purpose, rather than building a new course for the new purpose from scratch. However, current e-learning resources often do not integrate well into the new context in many cases. Therefore, changes have to be made to the learning resources prior to re-use of the content of the learning resources. For example, to alter the content or layout of a course for use in the modified course it can be necessary to modify a learning resource, to segment a learning resource into smaller parts, or to aggregate parts from different learning resources into a new learning resource.

The task of modifying the electronic content in an e-learning course must cope with the format-dependency of the learning resources, the fact that content generally is stored in multiple discrete files (or documents), the potential loss of information, during the modification process, and explicit semantic relations (e.g., relations or equal values in metadata) and explicit semantic relations (e.g., content relating to similar topics or having didactic dependencies) between different learning resources.

Thus, format-dependency may require a developer to implement the same modification process anew for each document format that is supported in the course, and the process must be adjusted to the features and limitations of the particular format. Furthermore, if content is spread over several related documents, the modification process should handle the multiple documents logically as one single learning resource. When content is spread over several documents in different formats it is difficult to handle the modification process in a generic manner without resorting to re-building the content in each dedicated set of formats.

SUMMARY

In a first general aspect, a method includes reading content stored in a plurality of electronic files, where the files belong to a course of learning resources. An object-oriented representation of structures of the content is generated, where the representation includes objects that represent portions of the content, and a semantic content model of the content is generated based on the object-oriented representation of the content. Instructions to modify the content are received and the object-oriented representation of the structures of the content is modified in response to the instructions from the user. In response to the modified object-oriented representation of structures of the content the content is modified.

Implementations can include one or more of the following features. For example, generating the object-oriented representation can include organizing the objects in a tree-structure defining hierarchical relationships between the objects. Generating the semantic content model can include generating semantic information about the content based on implicit semantics between objects of the object-oriented representation. The method can further include defining a mapping between semantic information in the semantic content model and objects of the object-oriented representation. The instructions to modify the content can be received from a user.

The plurality of electronic files can include files stored in different formats, and the object-oriented representation can be independent of the format in which the content is stored. Modifying the content stored in a particular electronic file in a particular format can include converting modifications to the object-oriented representation into modifications to the content stored in the particular electronic file using a format-dependent plug-in module between the object-oriented representation and the content stored in the particular format. Modifying the content stored in the plurality of electronic files can include invoking a plurality of plug-in modules, where each plug-in module is adapted for modifying a particular format of electronic file, for executing modifications to the content based on modifications to the object-oriented representation. Modifying the content stored in an electronic file can include identifying an object of the object-oriented representation associated with the content to be modified, and issuing a command to modify the identified object.

In another general aspect, an apparatus includes a machine-readable storage medium having executable-instructions stored thereon. The instructions include an executable code segment for causing a processor to read content stored in a plurality of electronic files, where the files belong to a suite of learning resources and at least some of the files are stored in different formats than other files, and an executable code segment for causing a processor to generate an object-oriented representation of structures of the content, where the representation includes objects that represent portions of the content that are independent of the format in which the content is stored. The instructions include an executable code segment for causing a processor to generate a semantic content model of the content based on the object-oriented representation of the content, and an executable code segment for causing a processor to receive instructions from a user to modify the content. The instructions include an executable code segment for causing a processor to modify the object-oriented representation of the structures of the content in response to the instructions from the user, and an executable code segment for causing a processor to modify the content in response to the modified object-oriented representation of structures of the content.

Implementations can include one or more of the following features. For example, the code segment for causing the process to modify the content stored in a particular electronic file in a particular format can include a code segment for causing the processor to convert modifications to the object-oriented representation into modifications to the content stored in the particular electronic file using a format-dependent plug-in module between the object-oriented representation and the content stored in the particular format. The code segment for causing the process to modify the content stored in the plurality of electronic files can include a code segment for causing the processor to invoke a plurality of plug-in modules, each plug-in module being adapted for modifying a particular format of electronic file, for executing modifications to the content based on modifications to the object-oriented representation.

In another general aspect, a system for modifying an e-learning course includes a plurality of plug-in modules configured for reading learning resources of the e-learning course stored in different particular formats of electronic files, an object-oriented representation of structures of content of the e-learning course, where the representation includes objects that represent portions of the content, a semantic content model of the content based on the object-oriented representation of the content, an transaction engine configured to modifying the object-oriented representation of the structures of the content in response to instructions from the user.

Implementations can include one or more of the following features. For example, the plug-in modules can be further configured for modifying the learning resources in response to the modified object-oriented representation of structures of the content. The object-oriented representation can include a free-structure defining hierarchical relationships between objects of the representation. The apparatus can further include a mapping engine configured for mapping entries of the semantic content model to objects of the object-oriented representation. The object-oriented representation can be independent of the format in which the content is stored. The plug-in modules can be further configured for converting modifications to the object-oriented representation into modifications to the learning resources of the e-learning course, where plug-in module is adapted for modifying a particular format of electronic file. The system can further include a semantic enrichment engine configured to add semantic information to the semantic content model based on the object-oriented representation of structures of content of the e-learning course.

The details of one or more implementations are set forth in the accompanying drawings and the description below. Other features will be apparent from the description and drawings, and from the claims.

DETAILED DESCRIPTION

As described herein, a common, format-independent representation of the content of all of the multiple learning resources of an e-learning course is created from the actual learning resources themselves. "Content" as used herein refers to both the data and the semantic content in the learning resources. The learning resources can be files or "documents" of many different types, including, for example, text, graphics, photos, animation, simulation, audio, and video, and many be stored in a variety of different formats (e.g., PDF, MPG, JPG, AVI, CSS, DOC, GIF, HTML, MIDI, MP3, MOV/QT, PNC; RAR, TIFF, TXT, WAV, BIN, CSS, PPT, XLS, and ZIP). Documents can be sub-divided into modules, although a document itself can be a module. A course consists of a collection of different learning resources. The format-independent representation of the content is created in a manner such that no information is lost when creating the representation, and the representation is then used to analyze and modify the course, such that the user is not burdened by the format-dependency of the individual learning resources.

The representation consists of three layers: the physical files of the learning resources, which are stored in a storage medium; a tree-like object-oriented model representing the structures of the learning resources (e.g., a tree of Java objects for the document model); and a semantic model that contains an outline of the content including semantic relations and decoration (e.g., a Resource Description Framework ("RDF") model for the semantic model). The models are sequentially built in a bottom-up approach. Thus, the object model is built by reading learning resource documents or modules from a storage device and creating an object tree from the content in the documents or modules. The semantic model is built based on the object model and provides information about the semantic content of the course to a user. The user then analyzes the semantic content model and makes modifications that are implemented as modifications within the object model. The modifications then are propagated to the learning resource modules stored on the storage device without losing relevant information.

Figure 1:
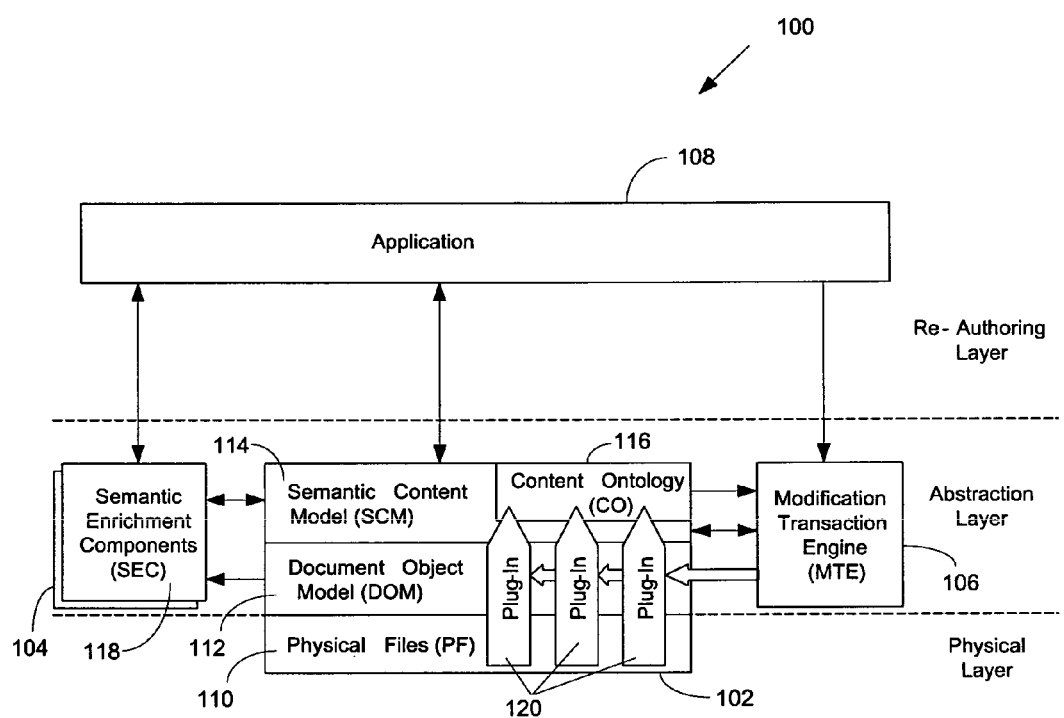
FIG. 1 is a schematic block diagram of a framework for modifying an e-learning course.

FIG. 1 is a block diagram of a framework 100 for organizing, analyzing and re-authoring an e-learning course composed of learning resources. The framework 100 is organized in three main blocks: a content model block 102, a semantic enrichment block 104, and a Modification Transaction Engine ("MTE") 106. An application layer 108 through which a user accesses the learning resources and representations of the learning resources communicates with the three blocks 102, 104 and 106 to allow the user to perform different tasks. The content model block 102 is used for analysis of the content of the course. The semantic enrichment block 104 is used for controlling the level of detail in the content model. The MTE 106 is used to modify the content in the course.

The content model block is divided into three layers: a physical files ("PF") layer 110, a document object model layer ("DOM") 112, and semantic content model layer ("SCM") 114, which are stacked one on top of the other within the framework 100. The physical files layer 110 is responsible for handling access to the physical files and directories of the learning resources (e.g., the HTML, PDF, TXT, MPG; JPG, etc. files that contain the content of the course). This includes access to the file system, working with the directory structure, as well as reading and writing files. Format plug-ins, as described below, may add support for modifying files on disk to the PF layer 110.

The DOM 112 is an object-oriented model that contains an outline (e.g., an object tree) that is created based on the structure of the documents in the physical files layer 110. After the object tree is created, the tree is transferred to the semantic content model 114, in which entities within the semantic model are marked so that they can be uniquely mapped to the entities of the DOM 112. Thus, the SCM 114 is a more abstract representation of the course content, containing only selected parts of the DOM structure but enriched with explicit semantic and didactic information about the content. The SCM 114 is complemented by a content ontology ("CO") 116 that provides conceptual knowledge about the used types of entities and relations.

The semantic enrichment block 104 contains one or more semantic enrichment components ("SEC") 118, which analyze the semantic content model 114 in order to make implicit semantics explicit to the semantic content model 114. An SEC 118 may also use and add external knowledge to fulfill this task. Thus, semantic relations can be added to the semantic content model 114 both during the conversion and afterwards as a result of a more intensive content analysis. The semantic content model 114 is then ready to be used for an analysis of the content.

After analysis of the semantic content model 114, a user can choose to modify the content of the e-learning course. However, the semantic content model 114 is only an incomplete outline of the whole content of the course, and because intended modifications to the semantic content may have different results on the content in the physical file layer 110 depending on the target document's format, modifications are carried out generally in the DOM 112. Because the DOM 112 is an outline of the complete content of the course, has read-write access to the physical files of the learning resources, and can handle format-specific data modifications where required, modifications to the format-independent DOM 112 result in modifications to the format-dependent learning resources within the physical file layer 110.

Thus, the application layer 108 analyzes the content through the semantic model 114, but modifies the content through the object model 112. Therefore, a mapping from the entities of the semantic content model 114 to the entities of the document object model 112 is necessary, as described below.

The modifications can be invoked by the application layer 108 as atomic modification transactions, where each modification is specified as a tuple that contains the type of modification, the target element(s), and optionally additional arguments. These modifications are handled by a dedicated modification transaction engine 106 that maps the transaction to the intended target objects in the DOM 112 and finally invokes the correct object methods. When a transactional modification has been performed successfully, the semantic model might need to be refreshed to account for new semantic content in the course.

The content model block 102 also includes format-dependent plug-in modules 120 that read and write between the content stored in learning resources in a particular format in the physical files 110 and the format-independent DOM 112 and the SCM 114. For each format that is to be supported, a plug-in 120 is provided, and the plug-ins contains the code to read, write, and modify its particular physical document format. Furthermore, the plug-ins 120 provide class definitions that extend the document model's base classes and an extension to the semantic model's ontology.

Figure 2:
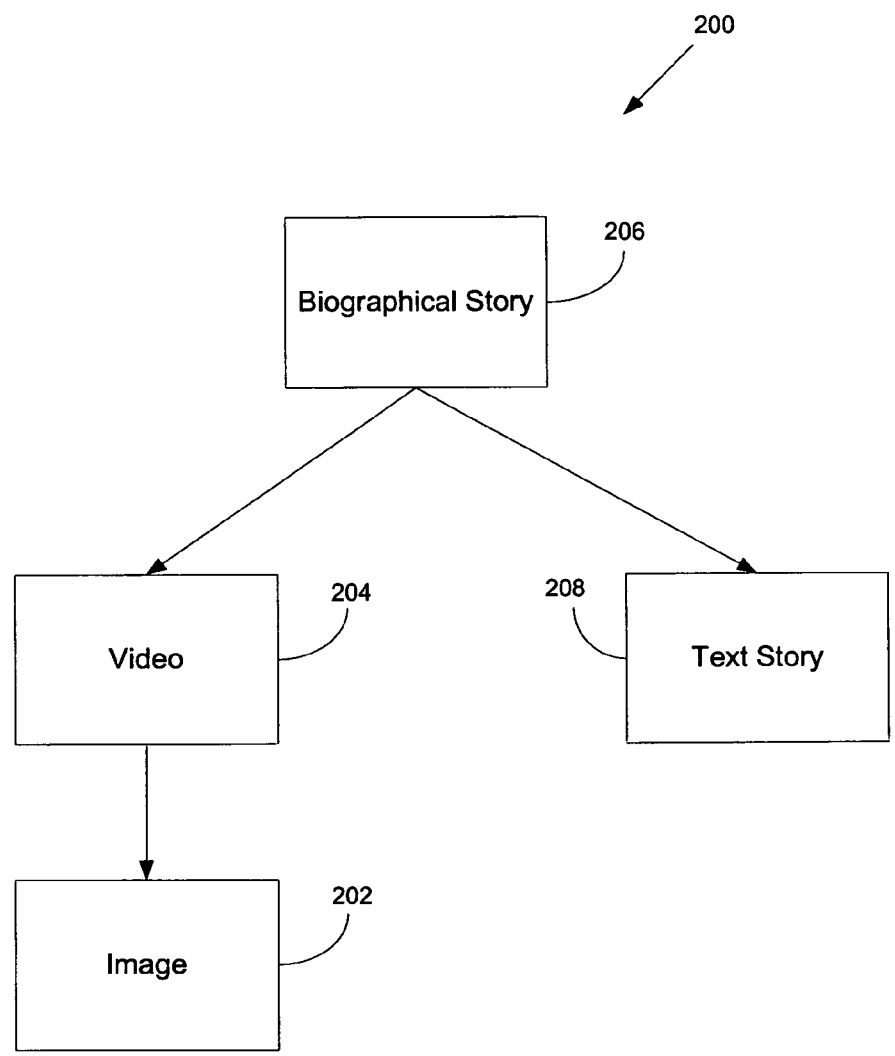
FIG. 2 is a schematic block of a document object model.

Referring to FIG. 2, the DOM can be a tree-like object-oriented representation 200 of the content in the learning resources of a course. The learning resources can be stored in the form of generic documents, and for each document that belongs to the content, a new partial DOM ("pDOM") can be created. These pDOMs are then joined to one single DOM by adding references from a sub-document's pDOMs to a parent document's pDOM. That is, the content DOM is a tree which consists of sub trees for the particular documents. Thus, a pDOM 202 that relates to an image of a person can be a sub-document of a pDOM 204 that relates to video footage of the person, which, in turn, can be a sub-document of a pDOM 206 that relates to a biographical story about the person. Additionally, a document containing textual information about the person can be a pDOM 208 of the pDOM 206. Together, pDOM's 202-208 can be joined in a tree 200 as a single DOM that relates to a multi-media biography about the person.

Metadata can be associated with the documents containing the content of the learning resources and used to structure the document object model 200. For example, metadata according to the Learning Object Metadata (LOM) standard can used to describe aspects of the learning resources. Thus, metadata can be used to store standard information about a learning resource's language, publication date, author, title, description, keywords, etc. and the DOM 200 and the pDOMs 202-208 can be built from the metadata.

In one example, documents formatted in IMS Content Packaging (IMS-CP), HTML, and JPEG can store the content of learning resources of a course. In the IMS-CP protocol, a Content Package is a compressed file (usually a zip file) that contains the learning object, its metadata record, and a manifest describing the contents of the package. The document object model 200 for IMS-CP documents can consist of Java classes and objects, in which the generic DOM 200 is built out of a set of pDOM java classes that represent standard types of document fragments and structural elements such as "TextFragment," "StructuralElement," "Title," or "Image." These java classes can be extended to include additional classes. For example, for representing IMS-CP documents, a class "OrganizationItem" can be defined and used to refer to documents relating to organizational content of a course, thus extending the "StructuralElement" class. Instances of the OrganizationItem class can be instantiated at run-time to represent structural items of the content package's manifest. The manifest itself can be an XML file, which can be read into memory by a standard XML-DOM library. Each instance of the class "OrganizationItem" therefore contains a reference to the corresponding standard DOM object. The data are stored primarily in the XML-DOM, and the CP objects provide only a view of the XML-DOM to simplify the access to the data. CP objects contain mainly getter/setter methods as well as special methods to access subordinated or referencing objects. In addition, the CP objects can work as a cache to accelerate access to the data. For example, an object "CPOrganization" can be assigned to an "OrganizationItem" element of the XML-DOM. The CPOrganization object permits the reading and writing of the "StructuralElement" and "Title," attributes, produced by requests from a list of the subordinate "Items" objects and can insert new items.

Similarly, for HTML document, generic content classes can be extended to suit the particularities of HTML. For example, there may be an "HTMLTitle" class which extends the "TextFragment" element and represents the <title>-element of an HTML document. In the background a standard HTML-DOM is used for reading and writing the document.

For the JPEG documents, each image can be represented as one single object, and the image object's methods can allow access to the extracted metadata of that image.

Figure 3:
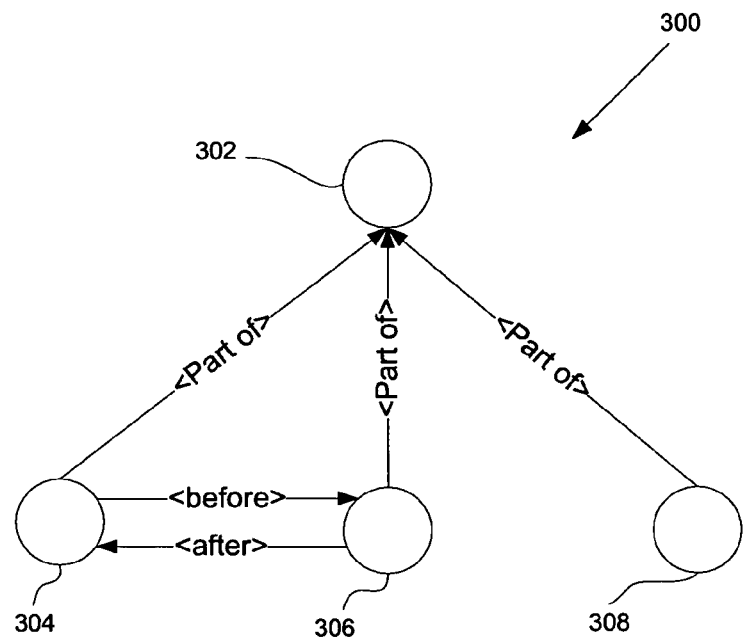
FIG. 3 is a schematic block diagram of a semantic content model.

Referring to FIG. 3, the semantic content model is an abstract representation of the content of the learning resources and includes interfaces to search and access semantic information about content parts of the learning resources. The SCM itself is described by a directed graph with typed relations. For example a Resource Description Framework model can be used for the SCM, because the RDF model permits creation of graphs that consists of typed nodes and relations. Multiple classes may be assigned to one node, such that the different meanings or roles of an individual content element can be expressed within the node.

As shown in FIG. 3, a base SCM graph 300 can be automatically constructed from the DOM and contains nodes 302, 304, 306, and 308 that reference each document object in the DOM as well as a relation of the type "part of" to the root node 302 of the graph, which provides an enclosing container for the whole content. A "before" and "after" relation is inserted between content nodes to refer to the sequential information of the content. For example, node 304 contains a "before" relation to node 306, and node 306 contains an "after" relation to the node 304 to indicate that semantic content identified in the node 304 comes sequentially before the semantic content identified by node 306 in the course described by the graph 300. Each node is marked with a unique identifier that references the underlying document object in the DOM. RDF libraries often contain their own query language such as RQL, RDQL or SeRQL, which are suited for analysis of the SCM.

Unlike the physical file layer 110 and the document object model layer 112, the SCM 114 does not allow direct manipulation of the mapped content parts. Instead, the SCM allows the application to draw conclusions from the structural organization or didactic information. With the aid of these conclusions the application can choose from a pool of content modification methods provided by the content dependent plug-in and executed by the Modification Transaction Engine to modify the course content. Thus, this approach fulfills the requirements of lossless manipulation of arbitrary content.

The document object model 112 is transformed into the semantic content model by rebuilding (parts of) the structure of the DOM in the RDF model used for the SCM 114 by mapping Java objects to RDF entities. The mapping algorithm starts with the top level element 202 of the DOM tree 200. This entity is assigned a type out of the content ontology 116 that corresponds to the Java object's class. Additionally, attributes of the Java object may be copied to the SCM as properties.

During the transformation from the DOM to the SCM, each Java object can checked for its relevance in the SCM by looking up the particular class in a black list, which is used in the application layer 108 to reduce the size of the SCM 114 by excluding certain object types from being converted to the SCM. If the object is considered relevant, an RDF entity corresponding to the Java object is created in the SCM. For example, in an application that translates a course from one language to another text and markup content need to be analyzed but images are not necessary. Hence, the image class can be placed on the black list, and image data will not be copied to the SCM, which thereby becomes smaller.

Each RDF entity in the SCM has a unique identifier, and, to map the RDF entry back to the Java object later, the entity's identifier and a reference to the Java object are stored in a hash table, using the identifier as key. The hash table is accessible by the Modification Transaction Engine 106. By reading all relevant tree nodes of the DOM 112, the DOM's structure is copied to the SCM 114. References from each RDF entry to the corresponding Java object are available in a hash table.

Knowledge about common content structure or didactical approaches is stored in several ontologies in the content ontology module 116. Additional format-dependant knowledge about the content can be added to the CO module 116 by the plug-ins that access content stored in particular formats in the physical file layer 110. For example, a plug-in for the PowerPoint format of learning resources knows that a presentation may include a slide master that typically holds layout information and can communicate this knowledge to the CO module 116.

The Content Ontology can be specified in the OWL Web Ontology Language because in OWL, classes and relation types can be defined for use within an RDF model. With the help of reasoners or inference machines, new information can be deduced from an RDF model and imported into the Content Ontology module 116. For each class of the Java DOM, a corresponding class can be specified in OWL. Additional classes are specified to express semantic information.

With the aid of the CO module 116 and a Reasoner, one or more semantic enrichment components 118 can add new node information or relations to the SCM 114. For semantic analysis and enhancement of the content, one or more SECs 118 can be integrated with the application layer 108 and with the content model block 102. A SEC analyses either the document object model 200 or the semantic content model 300 to gain information about semantic information in the course. This information may either be implicit semantics, which is simply transferred into explicit knowledge, or new semantics that are derived from the content with the help of additional external information sources.

An SEC 118 can be a Java object that has access to the Java document object model 112 and to the RDF semantic content model 114. For accessing the RDF semantic content model 114, the SEC 118 can use either an RDF query language or direct access to the RDF library. The SEC 118 analyzes either both models or only one of them and finally adds a set of statements to the RDF graph in the semantic content model 114. The SEC can update and enrich the SCM 114 by adding the identified semantic information to the SCM by adding relations to the graph and adding additional information to the content nodes 302-308.

For example, when a user wants to modify a course by translating its content into a different language, the user may want to know the language of text fragments and also have quotations marked, so that direct quotations will remain in their original language in spite of the translation modification. Two separate SECs can be designed for performing the tasks of identifying and marking the language of text fragments and for locating quotations in the text, so that they can be re-used independent from each other for other applications. The first SEC is responsible for determining and marking the language of text fragments. It requests all text fragments from the SCM and, based on comparisons to dictionaries of different languages it decides which language each fragment most probably belongs to. The text fragment entity is marked by adding a language property to the text fragment in the SCM 114. The second SEC identifies quotations inside text fragments. This component requests all text fragments and analyzes them. Multiple indicators can be used for recognizing quotations, for example, the explicit usage of markup such as the <q> and <blockquote> tags in HTML can be used. Another indicator is the use of quotation marks, although this one is less reliable. To all identified text entities in the SCM 114 a type "Quotation" can be added in the SCM.

Modifications to the content of a course are carried out through the Modification Transaction Engine 106. Because the semantic content model 114 is a graph that represents the content of the course in an abstract way it does not contain all information that is available on the lower abstraction layers (e.g., the DOM 112 and the PF layer 110). The SCM 114 is optimized for analysis, but modifications can not be performed directly on this model. Therefore, all modifications have to be passed to the DOM-layer 112 and, respectively, to the format plug-ins 120 for execution in the physical file layer 110. The modification transaction engine MTE 106 serves as a consistent interface between the SCM 114 and the PF layer 110.

The MTE 106 accepts modification commands in the form of tuples that represent transactional modifications on the data object model 112. The complexity of a transaction may vary from simple modifications such as a permutation of structural nodes or the change of a node's attribute to complex modifications such as the translation of text.

A command tuple can include command identifiers, content node identifiers, and simple data values. A command identifier can specify the command type, i.e., what the command executer is supposed to do. The targets of a command can be specified by node identifiers that allow a unique mapping from SCM entries and instances in the document object model 112. Simple data values, such as strings, integers, or floating point numbers can be used as additional arguments.

Several examples of valid commands could be: (CMD_DELETE, 376), which would delete the node with identified as (RDF-)ID 376; (CMD_MOVE, 13, 412), which would relocate the node 13 to a location below node 412; (CMD_REPLACE_TEXT, 14, "new text"), which would change the text of node 14 with the string, "new text"; and (CMD_REPLACE_Image, 32, "c:/images/new_image.jpg"), which would replace the image node 14 by a new image that has to be copied from the file identified as "c:/images/new_image.jpg." Thus, the MTE 106 is responsible for mapping the given node identifiers in the SCM 114 to the corresponding objects in the DOM 112, mapping the given command identifiers to object methods, converting the arguments (content nodes and simple values) to match the methods' signatures, and calling the object methods that perform a transaction execution.

The Modification Transaction Engine (MTE) 106 can be implemented as a Java component that accepts modification commands as method calls. This method may have a signature such as modificationCommand(List command), where the command list contains the values of a command tuple. Command identifiers are expressed constants, entity identifiers as URI strings. The MTE has access to a hash table where the Java object in the DOM corresponding to each entity in the SCM is stored. When the MTE is given a command it first resolves the entity identifiers into Java object references. Then it identifies the object whose method has to be called to execute the command. For example, the command (CMD_REPLACE_TEXT, 14, "new text"), which issues an instruction to replace the text in node 14 with the text "new text," would be transformed into (CMD_REPLACE_TEXT, <java_object_x>, "new text") first. Because the MTE knows the command template for 'CMD_REPLACE_TEXT', it identifies <java_object_x> as the object in charge and the given string "new text" as single argument for the object's method replaceText. This method replaceText is finally called with the call "java_object_x.replaceText ("new text")."

Some modifications commands are available for all format types; others are valid only for particular formats. Hence, each submitted command has to be checked against the involved plug-ins' capabilities to determine whether the command is supported or not.

Figure 4:
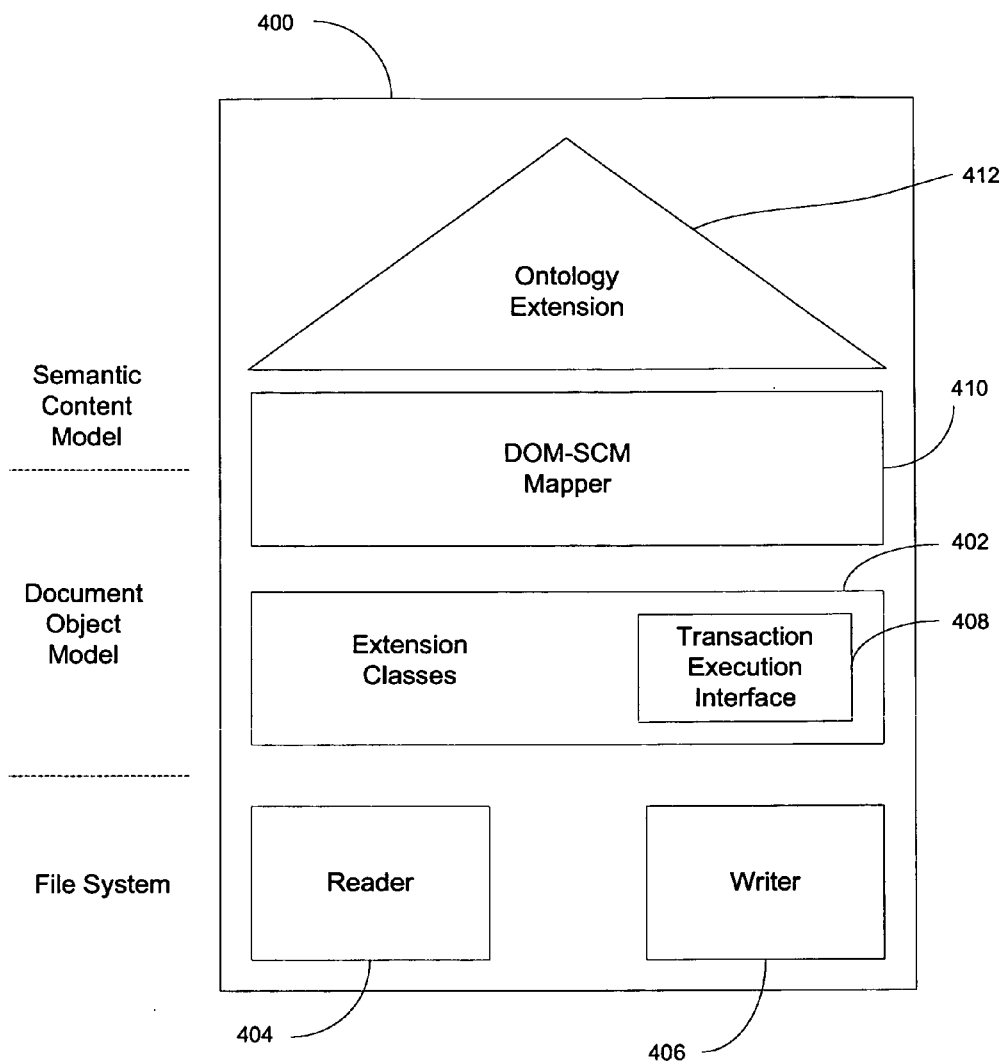
FIG. 4 is a schematic block diagram of a plug-in module.

While the components of the SCM 114 and the DOM 112 are designed to work in a format-independent manner, format-plug-ins 120 are used to add format-specific functionality to the framework 100. Referring to FIG. 4, a plug-in 400 can include an extension of the model classes, code for transformations between the model layers and code for transaction execution. Thus, components of a format plug-in can include: DOM Extension Classes 402; a Document Reader 404; a Document Writer 406; a Transaction Execution Interface (TEI) 408; a DOM-to-SCM Mapper 410; and a Content Ontology Extension 412.

DOM Extension Classes 402 are classes that are used to build a document object model 200 from a document in a particular document format. These classes though should implement generic interfaces, so that the framework 100 can access generic methods on them.

The Document Reader 404 is a module that reads all required data from a file to build a DOM 200. Thus, the Reader (or parts of it) may also be part of the DOM Extension Classes. For the opposite direction, i.e., writing information to the storage medium on which the learning resources are stored, a Document Writer 406 is used. The Document Writer 406 need not write a complete DOM to disk, but can also modify a portion of a file directly on disk, which can result in more efficient performance, especially for large files.

Another part of a plug-in is the Transaction Execution Interface (TEI) 408. A TEI is typically embedded in the DOM Extension Classes 402; it handles all modification transaction commands that affect elements of the particular format. The tasks of the TEI include: providing information about available modification methods to the MTE; checking if a particular command is supported; and redirecting modification method calls to the appropriate internal methods.

How a modification is handled inside the plug-in 400 is transparent to the remaining system. The TEI 408 takes all modification transactions and hands them over to internal methods. Modifications may be processed either by the DOM 112 in main memory, or by the document writer 406 by changing the data on storage medium.

The content ontology for the semantic content model can be extended by format-specific add-ons n the ontology extension 412. This includes new or extended types, as well as additional attributes and relations that are special to the particular format. Furthermore, inference rules for the extended ontology may be added.

Furthermore, the DOM-to-SCM Mapper 410 is a component for rendering a document object model 112 into the corresponding semantic content model 114. The Mapper 410 is controlled by a configuration that influences, for example, which entities of the DOM are mapped to the SCM, which attributes of the entities are mapped to the SCM, and which additional implicitly-known information is added to the SCM. Especially for large files, a reduction to a small subset of data can be helpful for fast processing. The mapping configuration in the Mapper 410 is specified at run-time, so that an application can align the model mapping with its current task.

Figure 5:
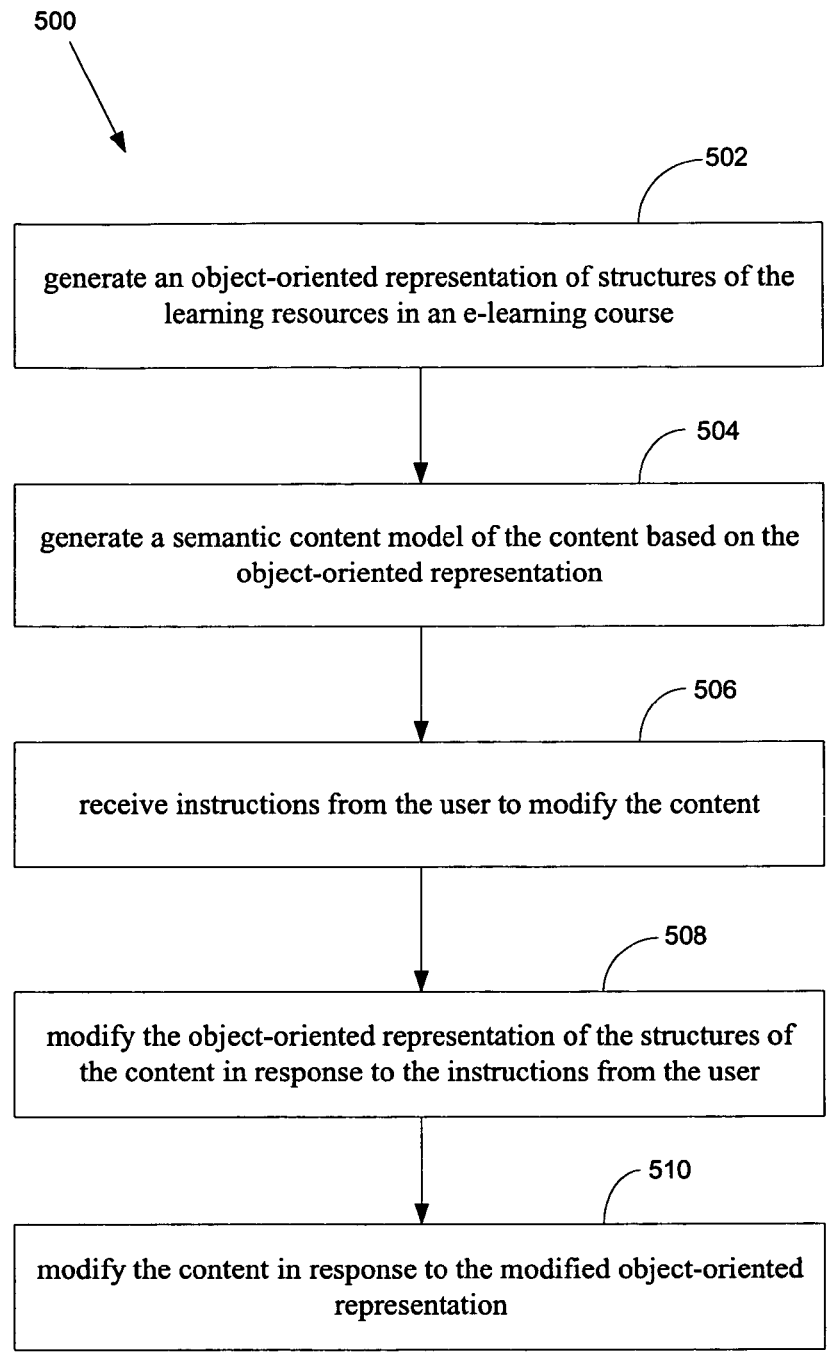
FIG. 5 is a flowchart of a process for modifying an e-learning course.

Referring to FIG. 5, the framework 100 can be used in a process 500 for modifying the content of an e-learning course. In the process, an object-oriented representation of structures of the content in an e-learning course are generated (step 502), and a semantic content model of the content is generated based on the object—oriented representation (step 504). Thereafter, the semantic content model is analyzed (step 506) and instructions are received from a user to modify the content (step 508). The object-oriented representation of the structures of the content is modified in response to the instructions from the user (step 510), the content in the e-learning resources is modified in response to the modified object-oriented representation of structures of the content (step 512).

Figure 6:
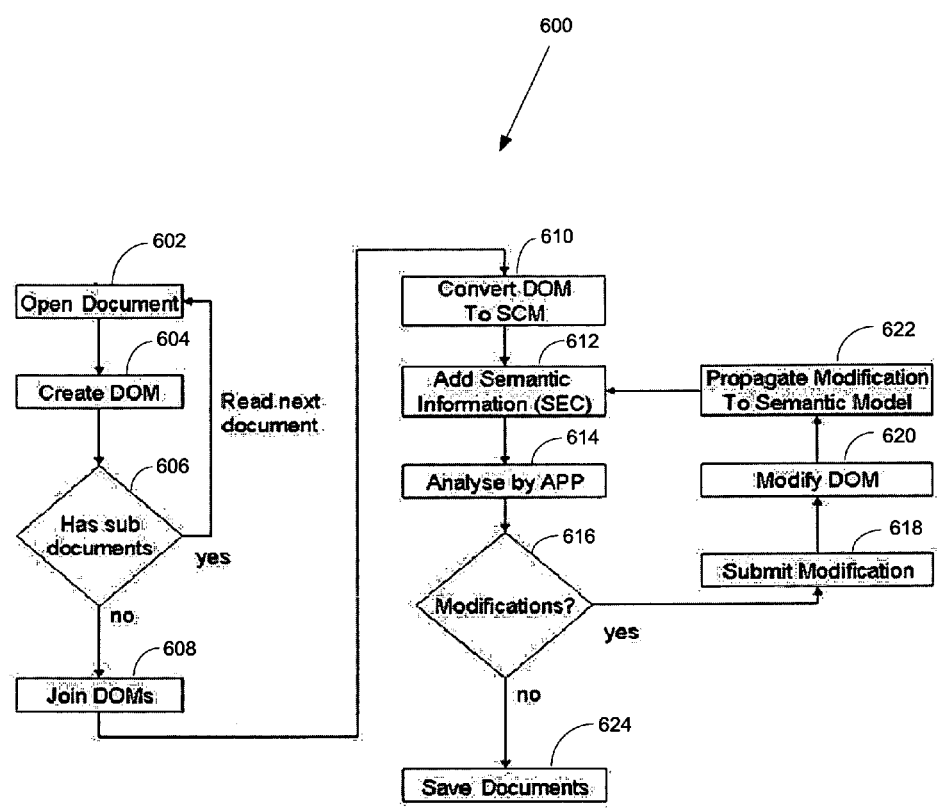
FIG. 6 is a flowchart of a process for modifying an e-learning course.

Referring to FIG. 6, a process 600 shows how the processes described in reference to FIG. 5 can be described in terms of several smaller processes. The process begins with reading the top level document of the e-learning course (step 602). This document is parsed and a partial DOM is created (step 604). If the document refers to a sub-document (query 606), for each reference to further included documents, this process of building a pDOM is repeated for each of the sub-documents. After all documents have been read, the individual pDOMs are joined to a single DOM by linking the various object trees to each other (step 608).

The document object model is then transferred to the SCM by copying desired nodes and the belonging connections from the DOM-tree to the SCM-graph (step 610). Thereafter, an analysis is performed by semantic enrichment components to insert additional information into the graph (step 612). After this process, the document object model and the semantic content model are complete and can be analyzed to analyze the content of the e-learning course.

The application has access to the SCM and may perform an analysis of the content (step 614). To add content or structural information to the SCM, the application can make use of one or more SECs. If a modification to the learning resource is desired (query 616), the application submits modification transaction commands (step 618). These commands are then executed on DOM-level and result in a changed document object model (step 620). The changes are also propagated to the semantic model (step 622). In some cases, semantic information that was previously added to the SCM must be recalculated after the modification. Once the modifications are applied to both the DOM and the SCM, the application may start to analyze the content again (step 616).

If no further changes are desired (query 618), the changed documents are saved (step 624) and the program quits.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the Memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method comprising:
    reading content of an e-learning course of learning resources stored in a plurality of electronic files, wherein the electronic files are stored in a plurality of formats;
    generating an object-oriented tree-structure representation of the content of the course based on the content that has been read from the electronic files stored in a plurality of formats, wherein the representation includes objects that represent portions of the content of the course and the tree-structure representation defines hierarchical relationships between objects of the representation and wherein the object-oriented representation is independent of the formats in which the files are stored;

generating a semantic content model of the content of the e-learning course, wherein the semantic content model includes an outline of the content including semantic relations and decoration, an abstract representation of the course content based on the object-oriented representation of the content, and semantic information about the content of the course based on implicit semantics between objects of the object-oriented representation;

providing information about the semantic content of the course model to a user through the semantic content model;

receiving instructions from the user to modify the content of the e-learning course;

modifying the object-oriented representation of the structures of the content in response to the instructions from the user; and modifying the content of the e-learning course stored in at least one electronic file in response to the modified object-oriented representation of structures of the content.

2. The method of claim 1, further comprising defining a mapping between semantic information in the semantic content model and objects of the object-oriented representation.

3. The method of claim 1, wherein modifying the content stored in a particular electronic file in a particular format comprises converting modifications to the object-oriented representation into modifications to the content stored in the particular electronic file using a format-dependent plug-in module between the object-oriented representation and the content stored in the particular format.

4. The method of claim 1, wherein modifying the content stored in the plurality of electronic files comprises invoking a plurality of plug-in modules, each plug-in module being adapted for modifying a particular format of electronic file, for executing modifications to the content based on modifications to the object-oriented representation.

5. The method of claim 1, wherein modifying the content stored in an electronic file comprises:
identifying an object of the object-oriented representation associated with the content to be modified; and
issuing a command to modify the identified object.

6. An apparatus comprising a machine-readable storage medium having executable-instructions stored thereon, the instructions including:
an executable code segment for causing a processor to read content stored in a plurality of electronic files, wherein the files belong to a suite of learning resources of an e-learning course and at least some of the files are stored in different formats than other files;
an executable code segment for causing a processor to generate an object-oriented tree-structure representation of the content of the course based on the content that has been read from the electronic files stored in a plurality of formats, wherein the tree-structure representation defines hierarchical relationships between objects of the representation and includes objects that represent portions of the content of the course that are independent of the format in which the files are stored;
an executable code segment for causing a processor to generate a semantic content model of the content of the e-learning course, wherein the semantic content model includes an outline of the content including semantic relations and decoration, an abstract representation of the course content based on the object-oriented representation of the content, and semantic information about the content of the course based on implicit semantics between objects of the object-oriented representation;

an executable code segment for causing a processor to provide information about the semantic content of the course model to a user through the semantic content model;

an executable code segment for causing a processor to receive instructions from the user to modify the content;

an executable code segment for causing a processor to modify the object-oriented representation of the structures of the content in response to the instructions from the user; and an executable code segment for causing a processor to modify the content in response to the modified object-oriented representation of structures of the content.

7. The apparatus of claim 6, wherein the code segment for causing the process to modify the content stored in a particular electronic file in a particular format comprises a code segment for causing the processor to convert modifications to the object-oriented representation into modifications to the content stored in the particular electronic file using a format-dependent plug-in module between the object-oriented representation and the content stored in the particular format.

8. The apparatus of claim 6, wherein the code segment for causing the process to modify the content stored in the plurality of electronic files comprises a code segment for causing the processor to invoke a plurality of plug-in modules, each plug-in module being adapted for modifying a particular format of electronic file, for executing modifications to the content based on modifications to the object-oriented representation.

9. A system for modifying an e-learning course, the system comprising:
a machine-readable medium having executable-instructions stored thereon;
a plurality of plug-in modules configured for executing instructions stored on the machine-readable medium to cause the plug-in modules to read learning resources of the e-learning course stored in different particular formats of electronic files, to generate an object-oriented tree-structure representation content of the e-learning course based on the content that has been read from the electronic files stored in a plurality of formats, wherein the tree-structure representation includes objects that represent portions of the content of the course and defines hierarchical relationships between objects of the representation, and to generate a semantic content model of the content, wherein the semantic content model includes an outline of the content including semantic relations and decoration, an abstract representation of the course content based on the object-oriented representation of the content, and semantic information about the content of the course based on implicit semantics between objects of the object-oriented representation;
and a transaction engine configured to execute instructions stored on the machine-readable medium to cause the engine to modify the object-oriented representation of the structures of the content in response to instructions from the user.

10. The system of claim 9, wherein the plug-in modules are further configured for executing instructions stored on the machine-readable medium to cause the plug-in modules to modify the learning resources in response to the modified object-oriented representation of structures of the content.

11. The system of claim 9, further comprising a mapping engine configured for executing instructions stored on the machine-readable medium to cause the engine to map entries of the semantic content model to objects of the object-oriented representation.

12. The system of claim 9, wherein the object-oriented representation is independent of the format in which the content is stored.

13. The system of claim 9, wherein the plug-in modules are further configured for executing instructions stored on the machine-readable medium to cause the plug-in modules to convert modifications to the object-oriented representation into modifications to the learning resources of the e-learning course, each plug-in module being adapted for modifying a particular format of electronic file.

14. The system of claim 9, further comprising a semantic enrichment engine configured execute instructions stored on the machine-readable medium to cause the engine to add semantic information to the semantic content model based on the object-oriented representation of structures of content of the e-learning course.

* * * * *